(12) United States Patent
Neuville

(10) Patent No.: US 12,428,342 B2
(45) Date of Patent: *Sep. 30, 2025

(54) FORMULATION FOR A LOW-CARBON CONSTRUCTION BINDER, METHOD OF PRODUCTION, AND CONSTRUCTION MATERIALS

(71) Applicant: MATERRUP, Saint-Geours-De-Maremne (FR)

(72) Inventor: Mathieu Neuville, Soustons (FR)

(73) Assignee: MATERRUP, Saint Geours-de-Maremne (FR)

( * ) Notice: Subject to any disclaimer, the term of this patent is extended or adjusted under 35 U.S.C. 154(b) by 130 days.

This patent is subject to a terminal disclaimer.

(21) Appl. No.: 17/418,959

(22) PCT Filed: Dec. 31, 2019

(86) PCT No.: PCT/FR2019/053319
§ 371 (c)(1),
(2) Date: Jun. 28, 2021

(87) PCT Pub. No.: WO2020/141285
PCT Pub. Date: Jul. 9, 2020

(65) Prior Publication Data
US 2022/0119313 A1     Apr. 21, 2022

(30) Foreign Application Priority Data

Dec. 31, 2018   (EP) ..................... 18306902
Feb. 8, 2019    (FR) ..................... 1901300

(51) Int. Cl.
C04B 14/04     (2006.01)
C04B 14/06     (2006.01)
(Continued)

(52) U.S. Cl.
CPC .......... *C04B 28/001* (2013.01); *C04B 14/045* (2013.01); *C04B 14/06* (2013.01);
(Continued)

(58) Field of Classification Search
CPC ............... C04B 28/001; C04B 22/062; C04B 2103/0081; C04B 2103/10; C04B 24/121;
(Continued)

(56) References Cited

U.S. PATENT DOCUMENTS

| 1,227,903 A | 5/1917 | Glynn |
| 1,331,554 A | 2/1920 | Armstrong |

(Continued)

FOREIGN PATENT DOCUMENTS

| CN | 1646446 A | 7/2005 |
| CN | 101234880 | 8/2008 |

(Continued)

OTHER PUBLICATIONS

Ramezanianpour (Chapter 3, Cement Replacement Materials, Springer Geochemistry/Mineralogy, DOI: 10.1007/978-3-642-36721-2_3, Springer-Verlag Berlin Heidelberg 2014).*

(Continued)

*Primary Examiner* — Jun Li
(74) *Attorney, Agent, or Firm* — Tucker Ellis LLP (57) ABSTRACT

The invention relates to a formulation of a low carbon construction binder including, in a dehydrated form, a raw clay matrix and a deflocculating agent. It also relates to a construction binder, a method of preparing this construction binder, as well as a construction material comprising the construction binder according to the invention.

24 Claims, 1 Drawing Sheet

(51) Int. Cl.

| | | |
|---|---|---|
| *C04B 22/06* | (2006.01) | |
| *C04B 24/00* | (2006.01) | |
| *C04B 28/00* | (2006.01) | |
| *C04B 28/04* | (2006.01) | |
| *C04B 28/08* | (2006.01) | |
| *C04B 40/00* | (2006.01) | |
| *C04B 103/00* | (2006.01) | |
| *C04B 103/10* | (2006.01) | |
| *C04B 111/00* | (2006.01) | |

(52) U.S. Cl.
CPC .......... *C04B 22/062* (2013.01); *C04B 24/003* (2013.01); *C04B 28/04* (2013.01); *C04B 28/08* (2013.01); *C04B 40/0039* (2013.01); *C04B 2103/0081* (2013.01); *C04B 2103/10* (2013.01); *C04B 2111/00482* (2013.01)

(58) Field of Classification Search
CPC .......... C04B 24/2641; C04B 2103/402; C04B 2103/406; C04B 24/16; C04B 24/243; C04B 24/2611; C04B 24/38
See application file for complete search history.

(56) References Cited

U.S. PATENT DOCUMENTS

| | | | |
|---|---|---|---|
| 3,915,719 | A | 10/1975 | Rafine |
| 4,207,114 | A * | 6/1980 | Schuster .................. C04B 33/13 264/43 |
| 4,742,105 | A | 5/1988 | Kelley |
| 6,042,258 | A | 3/2000 | Hines et al. |
| 6,221,148 | B1 * | 4/2001 | Mathur ................... C04B 28/04 106/486 |
| 6,656,994 | B1 | 12/2003 | Dreher et al. |
| 9,067,826 | B2 * | 6/2015 | Bullerjahn ................ C04B 7/02 |
| 9,957,434 | B2 * | 5/2018 | van Oort ............... C04B 28/006 |
| 10,315,115 | B2 | 6/2019 | Pawlowski et al. |
| 10,355,278 | B2 | 7/2019 | Yammie et al. |
| 10,544,060 | B2 | 1/2020 | Hoffman |
| 11,401,215 | B2 | 8/2022 | Neuville et al. |
| 11,827,573 | B2 * | 11/2023 | Neuville ............... C04B 24/128 |
| 2005/0164868 | A1 * | 7/2005 | Choi ....................... C04B 28/08 501/141 |
| 2006/0185559 | A1 | 8/2006 | Chang |
| 2007/0266905 | A1 | 11/2007 | Amey et al. |
| 2008/0271641 | A1 | 11/2008 | Ko et al. |
| 2008/0271644 | A1 | 11/2008 | Ko et al. |
| 2014/0238276 | A1 | 8/2014 | Baalbaki et al. |
| 2014/0336305 | A1 | 11/2014 | Shink et al. |
| 2016/0326056 | A1 * | 11/2016 | Chen .................. B01D 67/0041 |
| 2017/0362123 | A1 * | 12/2017 | Yammine ........... C08G 73/0266 |
| 2017/0362477 | A1 * | 12/2017 | Weinberger ............ C09J 133/08 |
| 2018/0111878 | A1 * | 4/2018 | Hoffmann ................ C04B 38/02 |
| 2019/0144339 | A1 * | 5/2019 | Bullerjahn ................ C04B 7/13 106/695 |
| 2023/0092136 | A1 | 3/2023 | Neuville et al. |

FOREIGN PATENT DOCUMENTS

| | | | |
|---|---|---|---|
| CN | 106278142 | | 1/2017 |
| CN | 107646025 | B | 1/2018 |
| CN | 107746240 | A | 3/2018 |
| CZ | 32396 | U1 * | 3/2018 |
| DE | 342403 | C | 9/1919 |
| DE | 354069 | C | 5/1922 |
| DE | 19921815 | | 11/2000 |
| DE | 10037609 | C1 | 9/2002 |
| EP | 0104100 | A2 | 3/1984 |
| EP | 2296854 | A2 | 3/2011 |
| EP | 2774900 | | 9/2014 |
| EP | 3247686 | B1 | 12/2015 |
| EP | 3524585 | A1 * | 8/2019 | ........... C04B 14/104 |
| FR | 1482794 | | 5/1967 |
| FR | 2417482 | | 9/1979 |
| FR | 2528822 | A1 | 12/1983 |
| FR | 2751911 | | 2/1998 |
| FR | 3016376 | | 7/2015 |
| FR | 3016376 | A1 | 7/2015 |
| FR | 3022541 | A1 * | 12/2015 | ........... C04B 14/04 |
| FR | 3034094 | | 9/2016 |
| FR | 3034094 | A1 | 9/2016 |
| FR | 3084357 | A1 | 1/2020 |
| JP | H08277174 | | 10/1996 |
| JP | 2002137958 | A * | 5/2002 |
| RU | 2013139856 | A * | 3/2015 | ........... C04B 28/04 |
| WO | 2003089383 | | 10/2003 |
| WO | 2015155110 | | 10/2015 |
| WO | 2016102867 | A1 | 6/2016 |
| WO | 2016156722 | A1 | 10/2016 |
| WO | WO-2016203293 | A1 * | 12/2016 | ........... B01F 13/1008 |
| WO | 2017072126 | | 5/2017 |
| WO | 2020025504 | A1 | 2/2020 |

OTHER PUBLICATIONS

Machine translation of CZ-32396-U1, publication date Mar. 22, 2018.*

Oti, et al. "Engineering properties of unfired clay masonry bricks." Engineering Geology vol. 107, Nos. 3-4. 2009. pp. 130-139.

Maskell, et al. "The Compressive Strength of Lignosulphonate Stabilised extruded Earth Masonry Units." University of Bath. 11th International Conference on the Study and Conservation of Earthen Architecture Heritage., Lima, Peru, Apr. 22, 2012-Apr. 27, 2012. 12 pages.

Evcin, A. "Investigation of the effects of different deflocculants on the viscosity of slips." Scientific Research and Essays vol. 6 (11), pp. 2302-2305, Jun. 4, 2011.

International Search Report in PCT/FR2019/053319 dated Apr. 15, 2020, 4 pages.

International Preliminary Report on Patentability in PCT/FR2019/053319 dated Feb. 23, 2021, 5 pages.

Lopez, Rodrigo Fernandez. "Calcined Clayey Soils as a Potential Replacement for Cement in Developing Countries." Ecole Polytechnique Federale De Lausanne. Thesis No. 4302. Feb. 6, 2009. 178 pages.

International Search Report & Written Opinion in PCT/FR2020/050469 dated Aug. 7, 2020, 31 pages (including translation).

Preliminary Search Report issued in French patent application No. FR2211581 dated Mar. 17, 2023, 12 pages.

Examination Report issued in Indian Patent Application No. 202117034381 dated Nov. 29, 2022, 5 pages.

Maskell, et al. "The Compressive Strength of Lignosulphonate Stabilised Extruded Earth Masonry Units." Terra 2012: 11th International Conference on the Study and Conservation of Earthen Architecture Heritage, Lima, Peru. Apr. 22, 2012-Apr. 27, 2012. 11 pages.

Koffi Léon Konan, Interactions Entre Des Materiaux Argileux Et Un Milieu Basique Riche En Calcium, Thesis to obtain the Degree of Doctor from the University of Limoges, Jul. 5, 2006, pp. 1-144, Thesis N°32-2006.

Moevus-Dorvaux, Mariette et al., Béton d'Argile Environnemental, 2010-2013, Résultats d'un programme de recherche tourné vers l'application, CRAterre éditions, Villefontaine, dépôt légal: jullet 2016, pp. 1-45, ISBN 978-2-906901-94-0, France.

Habib Pierre. Préparation des suspensions argileuses. In: Groupe Français des argiles. Compte rendu des réunions d'études, vol. 1, 1949. pp. 55-56, doi : https://doi.org/10.3406/argil.1949.884.

Gnanli Landrou, et al., Procédé innovant pour développement d'un béton d'argile auto-plaçant, pp. 1-4, Proceedings of the Terra 2016 conference, Villefontaine: CRAterre. ISBN 979-10-96446-12-4.

Ali Assifaoui, Etude de la Stabilite de Barbotines a Base D'Argiles Locales, Thesis to obtain the Degree of Doctor from the Universite Hassan II Ain-Chock Faculte Des Sciences Casablanca, Mar. 2, 2002, pp. 1-229, Morocco.

Samira Zemouli, et al., Utilisation due laiteir granule broyé des hauts fourneaux dans la stabilization des sols (Use of ground granulated blast furnace slag in soils stabilization), Laboratoite (56) References Cited

OTHER PUBLICATIONS

Matériau, Géotechnique et Environnmental (LMGE), Faculté des sciences de l'ingénieur, Université Badji Mokhtar-Annaba, May 2, 2018, pp. 1-12, Algérie.
Ciments Calcia Italcementi Group, Product Sheets for N°certificat CE : 0333-CPR-5202 and 0333-CPR-5002, Jan. 7, 2013, pp. 1-3, France.
Ecocem France, Laitier granule de jaut-fourneau moulu CE produit à Fos-sur-Mer, Technical Sheet, p. 3, Revision Mar. 6, 2018.

* cited by examiner

FORMULATION FOR A LOW-CARBON CONSTRUCTION BINDER, METHOD OF PRODUCTION, AND CONSTRUCTION MATERIALS

The invention relates to the field of construction materials, and more particularly to that of binders that can be used in construction. The invention relates to a formulation for a construction binder. The invention also relates to a method of preparing a construction binder, the construction binder as such, as well as the use of such a binder in the production of construction materials.

PRIOR ART

Cement is the second most consumed resource in the world, with more than 4 billion tons of material produced each year worldwide, and this consumption is constantly increasing, driven by the growing demand for housing and infrastructure.

Cement is a generally hydraulic binder that, mixed with water, hardens and sets. After hardening, cement retains its strength and stability even when exposed to water. There is a wide variety of cements used around the world. Nevertheless, all conventional cements include clinker at a percentage ranging from 5% for some blast furnace cements to a minimum of 95% for Portland cement, which is the most widely used cement in the world today.

Clinker is the result of firing a mixture of about 80% limestone and 20% aluminosilicates (such as clays). This firing, clinkerization, is done at a temperature of more than 1200° C., therefore such a cement preparation process implies a high energy consumption. In addition, the chemical conversion of limestone to lime also releases carbon dioxide. As a result, the cement industry generates about 8% of global $CO_2$ emissions. In response to this challenge, industry and researchers are exploring ways to reduce the impact of carbon dioxide emissions generated from the cement industry.

A first solution led to the creation of a cement plant using a combination of waste-based alternative fuels and technologies related to the capture and storage of carbon emitted during cement production, to achieve zero emission status. However, these solutions are not yet available on an industrial scale and require heavy investments.

The preferred route is to find substitutes for Portland cement, which is far too energy-intensive. Indeed, the development of alternative construction binders, requiring less energy consumption for their production, could reduce the energy footprint of the entire construction industry (Maddalena, et al, "Can Portland cement be replaced by low-carbon alternative materials? A study on the thermal properties and carbon emissions of innovative Cements", Journal of Cleaner Production 186; 2018; 933-942).

For example, a new hydraulic binder has been proposed that is similar to Portland cement but includes secondary constituents such as ash formed during coal combustion in power plants. However, the secondary constituents (ash, pozzolan, blast furnace slags) generally account for a maximum of 35% of the mixture and this composite Portland cement then contains at least 50% clinker. This is still too high a clinker content to be a real low carbon alternative to Portland cement. Metakaolin-based hydraulic binders or cements have also been proposed. Metakaolin is a dehydroxylated alumina silicate of the general composition $Al_2Si_2O_7$, it is a largely amorphous dehydration product of kaolinite, of the general formula $Al_2(OH)_4Si_2O_5$ which has a strong pozzolanic activity. In general terms, the pozzolanic activity of a material can be defined as the ability of a material, which does not possess binding properties, but which in finely divided form and in the presence of moisture, reacts chemically with calcium hydroxide at room temperature to form compounds with binding properties. Kaolinitic clays are widely available in the earth's crust and a heat treatment (e.g. from 600 to 800° C. for a short period of time called "flash") leads to the dehydroxylation of the kaolinite crystal structure to give metakaolin. The mixture of lime or sodium hydroxide and metakaolin during the hydration of the cement will induce a pozzolanic reaction. This reaction improves the binding properties of metakaolin-based cements. Because of these properties, metakaolin-based construction materials have been proposed, including a flash metakaolin associated with sodium hydroxide, as described in document FR3034094 or U.S. Ser. No. 10/315,115. The rheological properties of these construction binders can be improved by adding plasticizers or water reducers such as polyacrylates or lignosulfonates. However, such methods, requiring high temperature rises, have a high energy consumption and therefore a carbon footprint that needs to be improved.

On the other hand, the use of uncalcined kaolinite or more widely of a raw clay matrix has been proposed for cements with lower carbon footprints (N. A. Hadi, "Geo Polymerization of Kaolin and Metakaolin Incorporating NaOH and High Calcium Ash", Earth Science Research Vol. 5, No. 1; 2016). However, these cements, as described in document FR3016376, either had physical properties, such as improved mechanical strength, reduced capillary absorption, or reduced liquid permeability, that were too low, or required the addition of a portion of Portland cement in order to have acceptable mechanical properties.

In addition, classically, it has been proposed to add construction binders to the soil to form construction materials. Nevertheless, these construction materials have limited mechanical properties. Indeed, the publication entitled "Construire en terre crue, construction-rénovation —finitions" by Ulrich Röhlen and Christof Ziegert (2013, éditions le Moniteur ISBN 978-2-281-11567-3), indicates that the compressive strength of soil concrete varies from 0.6 MPa to a maximum of 12 MPa, with a common value of around 3 MPa. In addition, the publication entitled "Traité de construction en terre" measures the evolution of the compressive strength of soil stabilized with cement, and shows in particular that the compressive strength value of a soil concrete containing 7% cement (i.e. 50% cement in the binder made up of cement and clay) never exceeds 12 MPa. This has always discouraged builders from using excessively high contents of raw clays in construction binders and more generally in construction materials requiring high compressive strengths.

Thus, there is a need for new formulations of construction binders with a low carbon footprint while generating mechanical properties of concretes at least equivalent or even superior to the mechanical properties of concretes from cements commonly used in the construction field, such as CEM I, CEM II, CEM III, CEM IV and CEM V cements as defined by the NF EN 197-1 standard.

Technical Problem

The invention therefore aims to overcome the disadvantages of the prior art. In particular, the invention aims at providing a formulation for a construction binder for, on the one hand, obtaining a construction material with mechanical properties at least equivalent to Portland cement and, on the other hand, improving the comfort of the inhabitants compared with a concrete formed from Portland cement.

The invention also aims at providing a method of manufacturing a construction binder for reducing the emission of greenhouse gases, such as carbon dioxide, emitted during the preparation of such a binder, while preserving the mechanical characteristics of said binder relating to its use in the construction field. The invention also relates to the use of a construction binder for the production of construction elements, capable of improving the comfort of the inhabitants compared to conventional concrete and in particular the hygrothermal properties of buildings.

BRIEF DESCRIPTION OF THE INVENTION

To this end, the invention relates to a formulation for a construction binder including, in a dehydrated form, a raw clay matrix and a deflocculating agent.

Thus, this dehydrated formulation is intended to replace, totally or partially, conventional cements such as Portland cement, lime, or calcium aluminate cement ("Calcium Sulfoaluminate Cement"—CSA, in Anglo-Saxon terminology). As will be shown in the following, this formulation allows the same mechanical performance as Portland cement (class C 25/30) to be achieved while reducing greenhouse gas emissions by 30 to 85%, and more generally by about 50%.

Moreover, the presence of a raw clay matrix allows a better hygrothermal transfer and thus better cooling properties of the construction using a binder resulting from this formulation.

According to other optional features of the formulation:
- the raw clay matrix includes at least one mineral species selected from: Kaolinite, Illite, Smectite, Bentonite, Chlorite, Montmorillonite, Muscovite, Hallocyte, Sepiolite, Attapulgite, Vermiculite and the so-called interstratified clays which are complex combinations of several clays The presence of one or more of these mineral species in the binder formulation allows a cement, and more generally a construction material with good mechanical properties, i.e. mechanical properties equivalent to the mechanical properties of a construction material containing Portland cement, to be obtained. Preferably, the raw clay matrix includes at least one mineral species selected from: Kaolinite, Illite, Smectite and Bentonite.
- it comprises at least 80 wt % of a raw clay matrix, preferably between 80 and 99.5 wt %, more preferably between 90 and 99 wt %. This amount of a raw clay matrix allows the mechanical properties of the materials built with this formulation to be improved.
- the deflocculating agent is selected from:
  - a non-ionic surfactant such as a polyoxyethylene ether,
  - an anionic agent such as an anionic agent selected from: alkyl aryl sulfonates, amino alcohols, carbonates, silicates, fatty acids, humates (e.g. sodium humates), carboxylic acids, lignosulfonates (e.g. sodium lignosulfonates), polyacrylates, phosphates or polyphosphates such as sodium hexametaphosphate, sodium tripolyphosphate, sodium orthophosphate, carboxymethylcelluloses and mixtures thereof;
  - a polyacrylate such as a polyacrylate selected from sodium polyacrylate or ammonium polyacrylate;
  - an amine such as an amine selected from: 2-amino-2-methyl-1-propanol; mono-, di- or triethanolamine; isopropanolamines (1-amino-2-propanol, diisopropanolamine and triisopropanolamine) and N-alkylated ethanolamines; or
  - mixtures thereof.

These deflocculating agents allow for a good dispersion of clays and are suitable for clay matrices that can be used in construction.
- the deflocculating agent accounts for at least 0.5 wt % of the raw clay matrix, preferably between 0.5 and 20 wt % of the raw clay matrix, more preferably between 1 and 10 wt %. Such a concentration allows the mechanical properties of materials made from this formulation to be improved.
- it comprises:
  - 80 to 99.5 wt % of a raw clay matrix, and
  - 0.5 to 20 wt % of a deflocculating agent.
- Such a formulation for a construction binder allows, in the case where such a formulation is used coupled with an activator composition, mechanical properties equivalent to Portland cement to be obtained.

The invention further relates to a construction binder including the constituents of the formulation of a construction binder according to the invention and an activator composition.

In particular, the invention further relates to a construction binder including a raw clay matrix, a deflocculating agent and an activator composition, characterized in that it comprises at least 30 wt % of a raw clay matrix.

The activator composition makes it possible to impart to the construction binder its mechanical properties of interest and in particular to structure the clay sheets.

According to Other Optional Features of the Construction Material:
- the construction binder includes less than 30 wt % of metakaolin, preferably less than 26 wt % of metakaolin, more preferably less than 21 wt % of metakaolin, less than 17 wt % of metakaolin, less than 13 wt % of metakaolin, even more preferably less than 10 wt % of metakaolin, less than 5 wt % of metakaolin. For example, it may not include metakaolin.
- the raw clay matrix includes at least one mineral species selected from: Kaolinite, Illite, Smectite, Bentonite, Chlorite, Montmorillonite, Muscovite, Hallocyte, Sepiolite, Attapulgite, Vermiculite and the so-called interstratified clays which are complex combinations of several clays.
- the raw clay matrix includes at least one mineral species selected from: Kaolinite, Illite, Smectite, Bentonite, Chlorite, Montmorillonite, Muscovite, Hallocyte, Sepiolite, Attapulgite, Vermiculite and the so-called interstratified clays which are complex combinations of several clays.
- It comprises at least 40 wt % of a raw clay matrix.
- the deflocculating agent is selected from:
  - a non-ionic surfactant such as a polyoxyethylene ether;
  - an anionic agent such as an anionic agent selected from: alkyl aryl sulfonates, amino alcohols, carbonates, silicates, fatty acids, humates (e.g. sodium humates), carboxylic acids, lignosulfonates (e.g. sodium lignosulfonates), polyacrylates, phosphates or polyphosphates such as sodium hexametaphosphate, sodium tripolyphosphate, sodium orthophosphate, carboxymethylcelluloses and mixtures thereof;
  - a polyacrylate such as a polyacrylate selected from sodium polyacrylate or ammonium polyacrylate;

an amine such as an amine selected from: 2-amino-2-methyl-1-propanol; mono-, di- or triethanolamine; isopropanolamines (1-amino-2-propanol, diisopropanolamine and triisopropanolamine) and N-alkylated ethanolamines; or mixtures thereof.

the deflocculating agent accounts for at least 0.25 wt % of the construction binder.

the activator composition accounts for at least 10 wt % of the construction binder.

the raw clay matrix, the deflocculating agent and the activator composition form a two-component or multi-component system.

it comprises:
  30 to 80 wt % of a raw clay matrix,
  0.25 to 20 wt % of a deflocculating agent, and
  10 to 50 wt % of an activator composition.

the activator composition is an alkaline activator composition. The alkaline composition may, for example, include a compound having a pKa greater than or equal to 10, more preferably greater than or equal to 12, even more preferably substantially equal to 14.

the activator composition comprises an organophosphorus compound such as sodium tripolyphosphate, preferably the organophosphorus compound accounts for at least 2 wt % of the construction binder.

it includes at least 2 wt % of metal oxides. In particular, the activator composition includes metal oxides. In particular, the metal oxides are present at a content of at least 2 wt % of the composition, preferably at least 5 wt % of the composition, even more preferably at least 10 wt % of the composition. Such a concentration allows the mechanical properties of materials made from this formulation to be improved.

the metal oxides are selected from: iron oxides such as FeO, $Fe_3O_4$, $Fe_2O_3$, alumina $Al_2O_3$, manganese (II) oxide MnO, titanium (IV) oxide $TiO_2$ and mixtures thereof.

the activator composition includes cement, preferably Portland cement. The cement can be, for example, a CEM I type cement.

it includes a blast furnace slag composition, preferably the blast furnace slag composition accounts for at least 5 wt % of the construction binder.

it comprises:
  40 to 70 wt % of a raw clay matrix,
  0.5 to 6 wt % of a deflocculating agent,
  5 to 20 wt % of an activator composition, and
  20 to 45 wt % of blast furnace slags.

It comprises:
  35 to 65 wt % of a raw clay matrix,
  0.5 to 5 wt % of a deflocculating agent,
  31 to 49 wt % of Portland CEM1 cement.

it comprises:
  35 to 65 wt % of a raw clay matrix,
  0.5 to 5 wt % of a deflocculating agent,
  10 to 30 wt % of blast furnace slags, and
  15 to 35 wt % of Portland CEM1 cement.

it comprises:
  45 to 70 wt % of a raw clay matrix,
  0.5 to 6 wt % of a deflocculating agent,
  10 to 35 wt % of an activator composition, and
  15 to 30 wt % of metakaolin.

it comprises:
  45 to 70 wt % of a raw clay matrix,
  0.5 to 5 wt % of a deflocculating agent,
  10 to 25 wt % of an activator composition,
  5 to 20 wt % of blast furnace slags, and
  15 to 30 wt % of metakaolin.

These quantities allow mechanical properties equivalent to Portland cement to be obtained, while having a much smaller carbon footprint.

The invention further relates to a method of preparing a construction binder.

The method of preparing a construction binder may include a step of mixing a raw clay matrix, a deflocculating agent and an activator composition, where said construction binder includes at least 30 wt % of a raw clay matrix.

In particular, the method of preparing a construction binder may in particular include the following steps:
  Preparing a clay suspension including at least one raw clay matrix, one deflocculating agent and water,
  Adding an activator composition to the clay suspension, where said activator composition can be an alkaline activator composition and/or include metal oxides, and
  Mixing so as to obtain a construction binder, where said construction binder includes at least 30 wt % of a raw clay matrix.

According to Other Optional Characteristics of the Method:
  it includes a step of mixing the clay suspension so as to obtain a deflocculated clay suspension and the activator composition is added after the mixing step.
  the construction binder comprises at least 50 wt % of a raw clay matrix, preferably between 50 and 80 wt %. It may also comprise at least 40 wt % of a raw clay matrix, preferably between 40 and 60 wt % of a raw clay matrix.
  the deflocculating agent accounts for at least 0.25 wt % of the construction binder, preferably at least 0.5 wt % of the construction binder, more preferably between 0.5 and 10 wt % of the construction binder.
  the activator composition is present at a content of at least 10 wt % of the binder. For example, metal oxides are present at a content of at least 10 wt % of the binder.

The invention further relates to a construction material such as a mortar, a coating, a plaster, insulation, a lightweight concrete, a prefabrication element, comprising the construction binder according to the invention.

According to Other Optional Features of the Construction Material:
  the construction binder comprises excavated soil, with said excavated soil including the raw clay matrix. Indeed, in contrast to known construction materials, it is possible within the framework of the invention to produce a construction binder, and therefore by extension a construction material, directly from excavated soil, having a satisfactory compressive strength. The excavated soil may further comprise aggregates, such as, but not limited to, sand and/or gravel.
  it further comprises one or more fillers, with the fillers being for example selected from mineral fillers or vegetable fillers. The fillers can be any fillers known to the one skilled in the art in the field of construction materials. In particular, they may be selected from recycled or non-recycled aggregates, powders, sand, grit, gravel and/or fibers. The fibers can be, in particular, fibers of a vegetable origin such as sawdust, wood chips and fibers, straw, flax, perlite, cork or even chenevotte. Preferably, the construction material according to the invention further comprises fibers of a vegetable origin.
  it comprises pigments.
  it further comprises an expanding or foaming agent, such as aluminum powder.

According to another aspect, the invention relates to the use of a construction binder according to the invention, for the production covering elements, in particular floor coverings, such as tiles, slabs, paving stones or edging, wall coverings, such as interior or exterior facade elements, cladding panels, boarding elements or roof coverings of the tile type, for the production of extruded or molded construction modules, such as bricks, or for the production of various extruded shapes.

The invention relates to the use of the construction binder according to the invention, for the production of composite materials, such as construction panels of the prefabricated panel type, prefabricated blocks such as door or window lintels, prefabricated wall elements, or any other prefabricated construction element.

The invention relates to the use of the construction binder according to the invention, for the production of insulating modules, such as partition panels, or lightweight insulating construction modules (with a density of less than 1.5 kg/L, preferably less than 1.2 kg/L, more preferably less than 1.0 kg/L, more preferably less than 0.7 kg/L).

The invention relates to the use of the construction binder according to the invention, for the production by additive manufacturing, such as by means of a 3D printer, of construction elements, buildings or houses, or decorative objects.

The invention relates to the use of the construction binder according to the invention in the form of a two-component system with either the constituents in solid form, on the one hand, and the constituents in liquid form, on the other hand, or the constituents in the form of two pastes, for the production of a sealant, an adhesive or a grout.

The invention also relates to the use, for the preparation of a construction binder, of a deflocculating agent in combination with a raw clay matrix, where said raw clay matrix accounts for at least 30 wt % of the construction binder, and an activator composition for obtaining a concrete having a minimum compressive strength on cylinders at day 28 as measured by the NF EN 206-1 standard greater than or equal to 20 MPa, preferably greater than or equal to 25 MPa, preferably greater than or equal to 40 MPa.

Other advantages and features of the invention will appear upon reading the following description given by way of illustrative and non-limiting example, with reference to the appended FIGURE.

DESCRIPTION OF THE INVENTION

In the following description, the term "wt %" in relation to the raw clay matrix, the formulation, the binder or the construction material is to be understood as a proportion based on the dry weight of the formulation, the binder or the construction material. The dry weight is the weight before the addition of water, for example, which is necessary for the formation of a construction binder.

The term "dehydrated" within the meaning of the invention corresponds to a formulation including a reduced amount of water and, for example, a water content of less than 20 wt %, preferably less than 10 wt %, more preferably less than 5 wt %, and for example less than 1 wt %. The water content can be measured by any method known to the state of the art. It can for example be measured according to the NF P 94 050 standard of September 1995 "Determination of the water weight content of materials: Oven drying method".

By "clay matrix" is meant one or more rock materials based on hydrated silicates or aluminosilicates of a lamellar structure, with said clay matrix being composed of fine particles generally originating from the alteration of silicates with a three-dimensional framework, such as feldspars. A clay matrix may thus include a mixture of such rock materials which may for example consist of kaolinite, illite, smectite, bentonite, chlorite, vermiculite, metakaolin or mixtures thereof. The expression "raw clay matrix" corresponds within the meaning of the invention to a clay matrix that has not undergone a calcination step. In particular, that is, it has not been subjected to any prior heat treatment. For example, this corresponds to a clay matrix which has not undergone a temperature rise above 300° C., preferably above 200° C., and more preferably a temperature above 150° C. Indeed, the raw clay matrix can undergo a heating step requiring a temperature rise generally equal to or lower than 150° C., but no calcination step.

By "deflocculating agent" or "deflocculation agent" is meant any compound which, in aqueous suspension, will dissociate aggregates and colloids. Deflocculating agents have been used, for example, in the context of oil drilling or extraction to make the clay more fluid and facilitate extraction or drilling.

By "activator composition" is meant any composition having the function of accelerating the formation of a compact structure, thereby increasing the mechanical strength of materials incorporating such an activator composition.

The term "substantially equal", within the meaning of the invention, corresponds to a value varying by less than 20% with respect to the compared value, preferably by less than 10%, even more preferably by less than 5%.

The inventor has developed a new formulation for a construction binder which could advantageously, but not limitatively, be used as a replacement for Portland cement, lime or CSA.

A formulation according to the invention and more specifically a construction binder according to the invention have the advantage of having a carbon footprint at least two times lower than most of the construction binders, or hydraulic binder, most used in the world today (i.e. Portland cement). Indeed, a construction binder according to the invention is mainly constituted of a clay matrix, also called a raw clay matrix, which has not undergone a calcination step, an energy-consuming step which also generates the emission of greenhouse gases and more particularly of carbon dioxide.

Moreover, a formulation or a construction binder according to the invention has a lower clinker content than equivalent products and allows, for equivalent mechanical properties, to reduce $CO_2$ emissions and production costs.

Advantageously, as will be shown in the examples, a construction binder according to the invention allows the manufacture of construction materials having mechanical properties at least equivalent to concretes formulated with Portland cement or "low carbon" materials, such as those described previously.

Thus, according to a first aspect, the invention relates to a formulation for a construction binder including, in a dehydrated form, a raw clay matrix and a deflocculating agent.

As mentioned, the use of a raw clay matrix allows the environmental impact of the construction binder to be reduced.

Deflocculating agents have already been used with clays. This is particularly the case in pottery and ceramics, where the preparation of a slip in a liquid and non-dehydrated state may involve mixing a deflocculating agent with a clay matrix. This practice allows the clay to be liquefied so as to recover only the fine particles and is not intended for the preparation of a construction binder. Here, without being limited by theory, the deflocculating agent can come to position itself at the interface of the sheets constituting the raw clay matrix and destructure it. Thus, the use of a deflocculating agent will make it possible to obtain, from the raw clay matrix, a formulation including a destructured raw clay matrix and capable of forming, in the presence of an activator composition, a more effective construction binder.

Such a formulation can be prepared extemporaneously or prepared on a production site and then possibly stored and then transported to the construction site.

Thus, the invention relates, for example, to a formulation of a construction binder including a raw clay matrix and a deflocculating agent, which is stored and/or transported pending its mixing with an activator composition, thereby enabling the formation of a construction binder. In particular, the formulation can be stored in containers with a capacity of 0.5 L to 50 L.

The general and preferred characteristics of each of the constituents of the formulation according to the invention will be presented in detail.

Raw Clay Matrix

The raw clay matrix may for example include at least one mineral species selected from: Kaolinite, Illite, Smectite, Bentonite, Chlorite and Vermiculite.

Table 1 below shows the chemical characteristics of these mineral species.

TABLE 1

| | Type of clay | Composition |
|---|---|---|
| Raw Clay Matrix | Illite | $(K, H_3O)(Al, Mg, Fe)_2(Si, Al)_4O_{10}[(OH)_2, (H_2O)]$ |
| | Smectite/ Montmorillonite | $(Na, Ca)_{0.3}(Al, Mg)_2Si_4O_{10}(OH)_2, n\ H_2O$ |
| | Kaolinite | $Al_2Si_2O_5(OH)_4$ |
| | Metakaolin | Anhydrous $Al_2Si_2O_5(OH)_4$ |
| | Bentonite | $(Na,Ca)_{0.3}(Al, Mg)_2Si_4O_{10}(OH)_2$ |

Preferably, a formulation according to the invention comprises at least 80 wt % of a raw clay matrix, more preferably at least 90 wt % of a raw clay matrix. In fact, the formulation for a construction binder according to the invention has the advantage of being able to include a high quantity of a raw clay matrix without this altering the mechanical properties of the construction materials, thus making it possible to produce construction materials with suitable mechanical performances.

Furthermore, preferably, a formulation according to the invention comprises at most 98 wt % of a raw clay matrix, more preferably at most 96 wt % of a raw clay matrix. Indeed, the formulation for a construction binder according to the invention also includes at least one deflocculating agent, thus limiting the proportion of a raw clay matrix in the formulation.

Thus, in particular, a formulation according to the invention may comprise between 80 and 99.5 wt % of a raw clay matrix, preferably between 90 and 99 wt % or between 80 and 98 wt % of a raw clay matrix, more preferably between 85 and 97 wt % of a raw clay matrix, and even more preferably between 90 and 96 wt % of a raw clay matrix.

Deflocculating Accent

Many compounds can act as deflocculating agents and many are generally known to the one skilled in the art.

In the context of the invention, the deflocculating agent is in particular a non-ionic surfactant such as a polyoxyethylene ether. The polyoxyethylene ether may for example be selected from: a poly(oxyethylene) lauryl ether.

The deflocculating agent may also be an anionic agent such as an anionic surfactant. In particular, the anionic agent can be selected from: alkyl aryl sulfonates, amino alcohols, carbonates, silicates, fatty acids, humates (e.g. sodium humates), carboxylic acids, lignosulfonates (e.g. sodium lignosulfonates), polyacrylates, phosphates or polyphosphates such as sodium hexametaphosphate, sodium tripolyphosphate, sodium orthophosphate, carboxymethylcelluloses and mixtures thereof.

The deflocculating agent may also be a polyacrylate. It may then be selected from, for example, sodium polyacrylate and ammonium polyacrylate.

The deflocculating agent may also be an amine selected from, for example: 2-amino-2-methyl-1-propanol; mono-, di- or triethanolamine; isopropanolamines (1-amino-2-propanol, diisopropanolamine and triisopropanolamine) and N-alkylated ethanolamines.

The deflocculating agent may also be a silicate such as sodium silicate, sodium metasilicate or sodium trisilicate.

Alternatively, the deflocculating agent may be a mixture of compounds, such as a mixture including at least two compounds selected from: non-ionic surfactant, anionic agent, polyacrylate, amine and organophosphorous compound.

In particular, the deflocculating agent may be a mixture of sodium silicate and sodium carbonate.

Preferably, the deflocculating agent is selected from: a lignosulphonate (e.g. sodium lignosulphonate), a polyacrylate, a humate and mixtures thereof.

The deflocculating agent is preferably in the form of a salt.

However, the invention is not limited to the above-mentioned deflocculating agents, any type of deflocculating agent known to the one skilled in the art may be used instead of the above-mentioned deflocculating agents.

In particular, the deflocculating agent accounts for at least 0.5 wt % of the raw clay matrix, preferably at least 1 wt % of the raw clay matrix, more preferably at least 2 wt % of the raw clay matrix, even more preferably at least 3 wt % of the raw clay matrix, and for example at least 4 wt % of the raw clay matrix. Indeed, with such concentrations of deflocculating agent, the binder formulation according to the invention can then be used in combination with an activator composition to form a material with advantageous mechanical properties.

Furthermore, the deflocculating agent accounts for at most 20 wt % of the raw clay matrix, preferably at most 10 wt % of the raw clay matrix. Indeed, too high a concentration is not necessary to form a material with advantageous mechanical properties.

In particular, the deflocculating agent accounts for between 0.5 and 20 wt % of the raw clay matrix, preferably between 1 and 10 wt % of the raw clay matrix, more preferably between 3 and 10 wt % of the raw clay matrix and even more preferably between 4 and 10 wt % of the raw clay matrix.

According to another aspect, the invention further relates to a construction binder including the constituents of the formulation of a construction binder according to the invention and an activator composition.

It is the addition of the activator composition, in conjunction with the raw clay matrix and the deflocculating agent, that will impart to the construction binder its mechanical properties of interest.

The construction binder can advantageously take the form of a two-component or multi-component system, i.e. it can include its constituents, namely the raw clay matrix, the deflocculating agent and the activator composition, in a juxtaposed form.

In particular, prior to a mixing step necessary for the actual use of the construction binder, the construction binder may be prepared so that the activator composition is not in contact with the raw clay matrix and/or the deflocculating agent. Such a feature has the advantage that the stability of the construction binder can be improved prior to its use.

For example, the construction binder may correspond to the combination of a mixture corresponding to the binder formulation according to the invention and an activator composition placed in another container. In a two-component or multi-component system, either the components may not all be in the same form (e.g. liquid, solid or paste) or the components are in paste form or they are placed in different containers.

Just before use, the construction binder can be mixed with water or, more generally, with an aqueous solution that allows the constituents of the construction binder to be thoroughly mixed. Nevertheless, before this addition of water, it could be in the form of a construction binder being at least partially in a dehydrated form.

As will be described below, the activator composition may be a liquid composition. Thus, the construction binder can be formed without the addition of water or an additional aqueous solution. Advantageously, and as will be detailed, some of the components of the construction binder (deflocculating agent and clay matrix) may be mixed with water prior to the addition of the activator composition.

Nevertheless, the construction binder can also be prepared advantageously in a dehydrated form. In this case, it can be mixed with an aqueous solution just before use. This makes it easier to transport and package.

Without being limited by the theory, the activator composition will allow the constitution of a network between the clay sheets which will impart its mechanical properties to the construction binder according to the invention.

The activator composition is, for example, present at a content of at least 10 wt % of the construction binder, preferably at least 15 wt % of the construction binder, more preferably at least 20 wt % of the construction binder, even more preferably at least 25 wt % of the construction binder, and for example at least 30 wt % of the construction binder.

In addition, the activator composition may account for at most 50 wt % of the construction binder, preferably at most 45 wt % of the construction binder, and more preferably at most 40 wt % of the construction binder.

In particular, the activator composition may account for between 10 and 50 wt % of the construction binder, preferably between 15 and 50 wt % of the construction binder.

More preferably, the activator composition accounts for between 10 and 35 wt % of the construction binder, even more preferably between 15 and 30 wt % of the construction binder.

In particular, the activator composition may include metal oxides and/or be an alkaline activator composition.

Preferably, the metal oxides are transition metal oxides.

More preferably, the metal oxides are selected from: iron oxides such as FeO, $Fe_3O_4$, $Fe_2O_3$, alumina $Al_2O_3$, manganese (II) oxide MnO, titanium (IV) oxide $TiO_2$ and mixtures thereof.

The metal oxides may preferably be derived from a composition of blast furnace slags, for example, formed during the production of pig iron from iron ore.

The metal oxides are present at a content of at least 2 wt % of the construction binder, preferably at least 5 wt % of the construction binder, more preferably at least 10 wt % of the construction binder.

When the activator composition is an alkaline activator composition. The alkaline composition may preferably include a compound having a pKa greater than or equal to 10, more preferably greater than or equal to 12, even more preferably substantially equal to 14. It can then be considered as a strong base.

In particular, the activator composition may include a mixture of sodium hydroxide and sodium silicate. The activator composition may be used in solid form. It can also be used, for example in the case of an alkaline activator composition, in liquid form. In this case, the percentage indicated for the formulations corresponds to the weight of the liquid composition. As regards the liquid alkaline activator composition, it may include between 10 and 70% of a mixture of sodium hydroxide and sodium silicate, preferably between 20 and 60%, more preferably between 30 and 50%, by gram of dry product of the total weight of the composition.

The alkaline composition, and more broadly the activator composition, may for example include an organophosphorus compound such as sodium tripolyphosphate designated by the acronym NaTPP.

Advantageously, the activator composition may be an alkaline activator composition further including metal oxides. As will be shown in the examples, construction binders prepared from such an activator composition have good mechanical properties. Thus, preferably, the activator composition may include metal oxides and at least one compound having a pKa greater than or equal to 10.

The activator composition may be an aqueous composition. Thus, it may preferably include water. As will be described below, its use may be combined with the addition of water in the formation of a construction binder according to the present invention. However, alternatively, the activator composition is in solid form, for example in powder form.

Preferably, the raw clay matrix accounts for at least 30 wt % of the construction binder, preferably at least 40 wt % of the construction binder, more preferably between 40 and 80 wt %, even more preferably between 45 and 65 wt %, even more preferably between 50 and 60 wt %.

Likewise, the deflocculating agent may account for at least 0.25 wt % of the construction binder, preferably at least 0.5 wt % of the construction binder, more preferably at least 1 wt % of the construction binder, even more preferably at least 1.5 wt % of the construction binder, and for example at least 2 wt % of the construction binder.

In addition, the deflocculating agent may account for at most 20 wt % of the construction binder, preferably at most 15 wt % of the construction binder, and more preferably at most 10 wt % of the construction binder.

In particular, the deflocculating agent can account for between 0.25 and 10 wt % of the construction binder, preferably between 0.5 and 10 wt % of the construction binder, more preferably between 1 and 10 wt % of the construction binder, between 1 and 8 wt % of the construction binder, between 2 and 8 wt % of the construction binder, between 2 and 5 wt % of the construction binder. Even more preferably, the deflocculating agent can account for between 0.5 and 6 wt % of the construction binder, between 1 and 4 wt % of the construction binder.

In a particular embodiment, a construction binder according to the invention comprises:
- 30 to 80 wt % of a raw clay matrix,
- 0.25 to 20 wt % of a deflocculating agent, and
- 10 to 50 wt % of an activator composition.

Preferably, a construction binder according to the invention comprises:
- 45 to 60 wt % of a raw clay matrix,
- from 0.25% to 5 wt % of deflocculating agent, preferably from 1% to 4%, and
- 10 to 50 wt % of an activator composition.

Preferably, a construction binder according to the invention comprises:
- 30 to 80 wt % of a raw clay matrix,
- 1 to 10 wt % of a deflocculating agent, and
- 10 to 50 wt % of an activator composition.

Preferably, a construction binder according to the invention comprises:
- 50 to 75 wt % of a raw clay matrix,
- 1 to 10 wt % of a deflocculating agent, and
- 15 to 50 wt % of an activator composition.

More preferably, a construction binder according to the invention comprises:
- 50 to 70 wt % of a raw clay matrix,
- 2 to 5 wt % of a deflocculating agent, and
- 15 to 45 wt % of an activator composition.

More preferably, a construction binder according to the invention comprises:
- 50 to 60 wt % of a raw clay matrix,
- 2 to 5 wt % of a deflocculating agent, and
- 25 to 45 wt % of metal oxides.

Even more preferably, a construction binder according to the invention comprises:
- 30 to 80 wt % of a raw clay matrix,
- 1 to 10 wt % of a deflocculating agent,
- 10 to 40 wt % of metal oxides, and
- 2 to 15 wt % of a strong base.

In addition to the raw clay matrix, the deflocculating agent and the activator composition, the construction binder may contain metakaolin, flash or not, cement, lime and/or plaster. In addition, as will be illustrated in the examples, some construction binder compositions may have mechanical performance equivalent to or better than Portland cement. Thus, even more preferably, a construction binder according to the invention comprises:
- 45 to 70 wt % of a raw clay matrix,
- 0.5 to 6 wt % of a deflocculating agent,
- 10 to 35 wt % of an activator composition, and
- 15 to 30 wt % of metakaolin.

Even more preferably, a construction binder according to the invention comprises:
- 35 to 65 wt % of a raw clay matrix,
- 0.5 to 5 wt % of a deflocculating agent,
- 10 to 30 wt % of blast furnace slags, and
- 15 to 35 wt % of Portland CEM1 cement.

Even more preferably, a construction binder according to the invention comprises:
- 40 to 70 wt % of a raw clay matrix,
- 0.5 to 6 wt % of a deflocculating agent,
- 5 to 20 wt % of an activator composition, and
- 20 to 45 wt % of blast furnace slags.

Even more preferably, a construction binder according to the invention comprises:
- 45 to 70 wt % of a raw clay matrix,
- 0.5 to 5 wt % of a deflocculating agent,
- 10 to 25 wt % of an activator composition,
- 5 to 20 wt % of blast furnace slags, and
- 15 to 30 wt % of metakaolin.

As mentioned, the above formulations are open formulations and the construction binder may additionally include complementary compounds such as plasticizers or water reducers.

In addition, the weight ratio of water to dry matter of the composition referred to herein as a construction binder is controlled and is preferably less than 1, advantageously substantially equal to 0.6.

According to another aspect, the invention relates to a method of preparing a construction binder. Such a method according to the invention, illustrated in FIG. 1, has the advantage of being a so-called low-carbon method, i.e. one whose greenhouse gas emissions, such as carbon dioxide emissions in particular, are reduced compared to the greenhouse gas emissions of known methods of preparing construction binders. Such reductions in greenhouse gas emissions are linked in particular to the absence of a calcination stage, which is particularly energy-intensive. In particular, the method includes preparing 110 a clay suspension including at least one raw clay matrix, one deflocculating agent and water. As before, the raw clay matrix may include at least one mineral species selected from: Kaolinite, Illite, Smectite, Bentonite, Chlorite, Montmorillonite, Muscovite, Hallocyte, Sepiolite, Attapulgite, Vermiculite and the so-called interstratified clays which are complex combinations of several clays. Advantageously, the preparation step 110 is initiated from a dehydrated premix comprising a raw clay matrix and a deflocculating agent.

Figure 1:
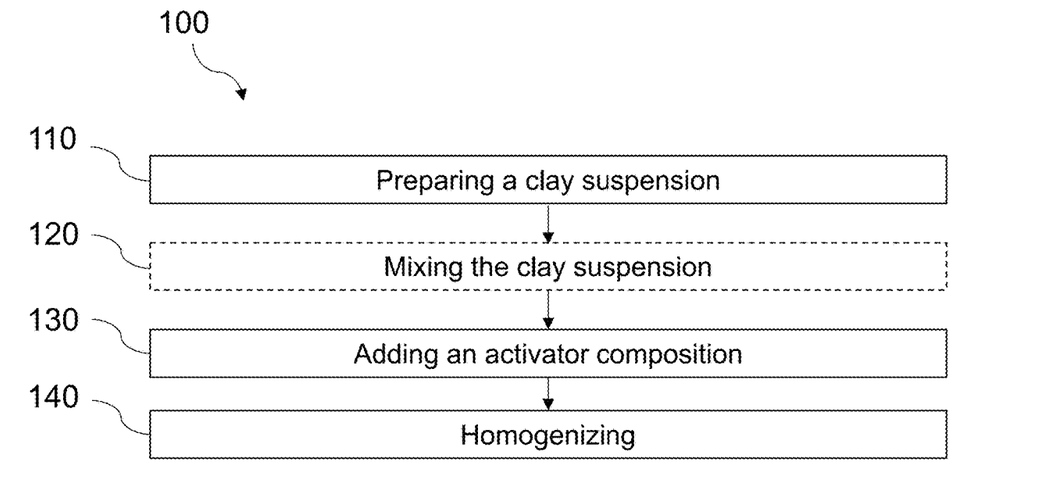
FIG. 1 shows a diagram of the method of preparing a construction binder according to the invention.

In the suspension preparation step 110, water may be added such that the ratio of the mass of water to the mass of construction binder is less than 1 and for example between 0.4 and 0.8. In addition, water can advantageously be added after the raw clay matrix and the deflocculating agent have been dry mixed.

Advantageously, the raw clay matrix used during the preparation step 110 of the clay suspension may come from soil excavated in the vicinity of the construction site. Thus, the method of preparing the construction binder may include a step of excavating soil including a raw clay matrix prior to preparing 110 a clay suspension. In addition, in this case, the method can include a step of preparing the excavated soil, where said preparation can include for example: drying, crushing, sieving, storing.

Thus, the preparation of a construction binder according to the invention may allow the preparation of a site concrete made at least in part from raw material from the construction site. Such characteristics further reduce the environmental footprint of the concrete produced.

Preferably, the method according to the invention may include, following the preparation of the clay suspension, a step 120 of mixing the clay suspension so as to obtain a dispersed or deflocculated clay suspension.

This step of mixing 120 the clay suspension can advantageously, but not limitatively, be performed in a device selected from: a mixer and a truck mixer or more generally within any device adapted to mix a clay suspension for the production of a construction binder, a dispersion device using ultrasound can also be used.

This step of mixing 120 the clay suspension, prior to the addition of the activator composition, may be performed over a period of at least 10 seconds, preferably at least 30 seconds, more preferably at least 60 seconds.

In addition, this step of mixing 120 the clay suspension, before the addition of the activator composition, can be performed over a period of at most 24 hours, preferably at most 12 hours, more preferably at most 6 hours.

The method also includes a step of adding 130 an activator composition to the clay suspension. As detailed above, the activator composition may include metal oxides and/or be an alkaline activator composition.

The method includes a homogenization or mixing step 140 so as to obtain a construction binder.

Before, concurrently with or after the addition of the activator composition, the method according to the invention may include the addition of additives or materials for modifying the mechanical properties of the final construction material.

The added materials can be, for example, recycled or non-recycled aggregates, selected from fillers, powders, sand, grit, gravel, and/or fibers, and optionally pigments.

The method may also include the addition of a plasticizer. The plasticizer may, for example, be a polyacrylate, a polynaphthalene sulfonate, a polycarboxylate or a polyphosphonate.

The method may also include the addition of fibers. The fibers are for example selected from: vegetable fibers such as cotton, flax, hemp, cellulose, bamboo, *miscanthus* fibers, synthetic fibers such as metal, glass, carbon, polypropylene fibers and mixtures thereof. The presence of fibers can allow the formation of a construction material with improved mechanical and insulating properties.

The method may also include the addition of aggregates. The aggregates are for example selected from: gravel, crushed, recycled concrete and mixtures thereof.

The method may also include the addition of an additive. The additive is for example selected from: a synthetic or natural rheologic retaining agent, an anti-shrinkage agent, a water retention agent, an air entraining agent, a synthetic resin and mixtures thereof.

In particular, the preparation of a construction binder according to the invention will include the addition of sand and water. The sand can be possibly obtained from the excavated material, particularly in the case of "site" concrete. The sand can also be desert sand.

The resulting construction materials can be for example selected from: mortars, coatings, or plasters.

Thus, according to another aspect, the invention relates to a construction material formed from the construction binder according to the invention.

Furthermore, the invention relates to a construction binder obtained from the method according to the invention. The invention relates to a construction material obtained from the method according to the invention.

The invention allows in particular the production of:
insulating construction material: from a construction binder according to the invention with added light aggregates of the "vegetable or porous" type;
lightweight concrete: from a construction binder according to the invention with added foaming agent of the aluminum powder type. This will allow air to be trapped in the material and its insulating properties to be improved;
Prefabrication elements: manufacture of concrete blocks or slabs in a factory from the construction binder according to the invention; and
Insulating modules.

Thus, the invention also relates to the use of the construction binder according to the invention, for the production of covering elements, for the production of extruded or molded construction modules, or more generally for the production of various extruded shapes.

The covering elements can for example be selected from floor coverings, such as tiles, flagstones, paving stones or borders, wall coverings, such as interior or exterior facade elements, cladding panels, boarding elements or roof coverings of the tile type. As regards the extruded or molded construction blocks, they are, for example, bricks.

The invention also relates to the use of the construction binder according to the invention, for the production of composite materials, prefabricated blocks,
Composite materials are, for example, construction panels of the prefabricated panel type, while prefabricated blocks are, for example, door or window lintels, prefabricated wall elements, or any other prefabricated construction element.

The invention also relates to the use of the construction binder according to the invention for the production of insulating modules, such as partition panels, or lightweight insulating construction modules. These insulating modules have, for example, a density of less than 1.5 kg/L, preferably less than 1.2 kg/L, more preferably less than 1.0 kg/L, and even more preferably less than 0.7 kg/L.

The invention also relates to the use of the construction binder according to the invention, for the implementation of additive manufacturing. In particular, the implementation of additive manufacturing may be performed using an automated 3D building system such as a 3D printer. Such additive manufacturing can be used to produce construction elements, buildings or houses, or decorative objects.

More generally, the invention also relates to the use, for the preparation of a construction binder, of a deflocculating agent in combination with a raw clay matrix, where said raw clay matrix accounts for at least 30 wt % of the construction binder, and an activator composition for obtaining a concrete having a minimum compressive strength at day 28 as measured by the ISO 1920-4:2005 standard (Testing of concrete—Part 4: Strength of hardened concrete) greater than or equal to 20 MPa, preferably greater than or equal to 25 MPa, preferably greater than or equal to 40 MPa.

The invention also relates to the use, for the preparation of a construction binder, of a deflocculating agent in combination with a raw clay matrix, where said raw clay matrix accounts for at least 30 wt % of the construction binder, and an activator composition for obtaining a concrete having a minimum compressive strength at day 28 as measured by the NF EN 197-1 standard greater than or equal to 20 MPa, preferably greater than or equal to 25 MPa, more preferably greater than or equal to 40 MPa.

As illustrated by the examples below, the present invention provides a solution based on a mixture of a raw clay matrix, a deflocculating agent and an activator composition to provide a construction binder with mechanical properties similar to the standard one while having a reduced carbon footprint.

EXAMPLES

Preparation of a Construction Binder:

In all the examples shown below, the formulations according to the invention are prepared according to an identical protocol, namely that a dry premix is made between a raw clay matrix and a deflocculating agent in predetermined quantities, and then water is added and the solution is mixed at low speed, i.e. substantially at six hundred revolutions per minute for thirty seconds. Next, an activator composition is added to the premix and then the premix is mixed at high speed, i.e. at about fifteen hundred revolutions per minute for three minutes.

The weight ratio of water to dry matter of the composition (also called the construction binder) is adjusted to a value substantially equal to 0.6.

The resulting construction binder is then poured into a mold and left to cure at room temperature, i.e. around 20 degrees Celsius, for 28 days.

Methodology for Measuring the Mechanical Properties of Construction Binders:

Once the maturation is complete, the mechanical strength is measured. By mechanical strength of a construction binder is meant its compressive strength, with such compression being measured in accordance with the NF EN 196-1 standard, for a prism with a side of 40 millimeters and a length of 160 millimeters and is expressed in Mega Pascal (MPa).

Comparison of the Construction Binders According to the Invention with Known Construction Binders:

Table 2 below shows, for different types of construction binders, known formulations and a formulation according to the invention. The mass of the components related to each formulation is expressed as a percentage of the total mass of the construction binder (dry weight).

TABLE 2

| | Formulations | | | |
|---|---|---|---|---|
| | CEM1 binder (Reference) | HP2A1 (Reference) | CMT (Reference) | MUP1 |
| Raw Clay Matrix | 0.0% | 0.0% | 75.0% | 55.0% |
| Deflocculating agent | 0.0% | 0.0% | 0.0% | 3.0% |
| Activator composition | 0.0% | 65.0% | 10.0% | 42.0% |
| Metakaolin | 0.0% | 35.0% | 0.0% | 0.0% |
| CEM1 cement | 100.0% | 0.0% | 15.0% | 0.0% |
| Compressive strength (MPa) | 45 | 42 | <10 | 45 |
| Estimated Carbon Footprint | Strong | Medium | Medium | Low |

Thus, table 2 shows the mechanical strengths of known construction binders (CEM1, HP2A1, CMT binders) which are not part of the invention, such as the CEM1 type construction binder, better known under the name of "Portland" cement, whose compressive strength is of the order of 45 MPa.

The HP2A1 formulation can be obtained by following the teachings of patent application FR3034094. The construction binder type HP2A1 comprises 35 wt % of metakaolin obtained by calcining kaolin, 65 wt % of an activator composition. Thus, the relative strength of such a construction binder, of the order of 42 MPa, is lower than the strength of Portland-type construction binder.

Finally, the CMT construction binder, obtained by following the teachings of patent application FR3016376, comprises 75 wt % of a raw clay matrix, 10 wt % of an activator composition comprising, in particular, lime, and 15 wt % of Portland type cement. The mechanical strength associated with such a binder including a majority of raw clay matrix is of the order of 25 MPa according to the patent application FR3016376 and would thus have a compressive strength substantially lower than that of Portland or HP2A1 type construction binders. Nevertheless, a reproduction of these tests by the applicant did not allow to obtain a strength greater than or equal to 10 MPa. Thus, in the presence of a high concentration of a raw clay matrix and in the absence of a deflocculating agent, a construction binder will not produce concrete with adequate mechanical properties.

Table 2 also shows a MUP1 formulation according to the invention. It is important to note that this formulation including 3% of a deflocculating agent, although including a majority of a raw clay matrix (55%), has a mechanical strength identical to the mechanical strength of Portland cement.

Importance of the Deflocculating Agent

Table 3 below shows a known formulation HP2A_X02 and three formulations according to the invention MUP2, MUP S9-1 and MUP S10-1.

TABLE 3

| | Formulations | | | |
|---|---|---|---|---|
| | HP2A2 (Reference) | MUP2 | MUPS9-1 | MUPS10-1 |
| Raw Clay Matrix | 54% | 51% | 51% | 60% |
| Deflocculating agent | 0% | 3% | 1.5% | 1.0% |
| Activator composition | 23% | 16% | 21% | 19% |
| Metakaolin | 18% | 20% | 19.5% | 20% |
| BFS | 5% | 10% | 7% | 0% |
| Compressive strength (MPa) | 27 | 43 | 46 | 40 |

The HP2A2 type construction binder comprises 54 wt % of a raw clay matrix, 23 wt % of an activator composition (alkali silicate solution and/or NaTPP), 18 wt % of metakaolin and 5% of BFS. In particular, such a formulation may be derived from the teaching of patent application FR3034094. The mechanical strength associated with such a binder is of the order of 27 MPa. On the contrary, the MUP2 binder obtained according to the invention and including a similar composition except for the presence of a 3% of a deflocculating agent has a mechanical strength of 43 MPa. Such strength can be considered equivalent to that of Portland cement.

Similarly, the MUPS9-1 binder obtained according to the invention and including a similar composition except for the presence of a 1.5% of a deflocculating agent has a mechanical strength of 46 MPa. Such strength can be considered equivalent to that of Portland cement. These results confirm the relevance of a construction binder according to the invention and highlight the advantage conferred on the compressive strength by the presence of metal oxides, for example from blast furnace slags.

Table 4A below shows the formulation according to the invention already presented MUP1 and an equivalent formulation to which the deflocculating agent has not been added.

TABLE 4A

| | Formulations | |
|---|---|---|
| | MUP1 | CMT2 (Reference) |
| Raw Clay Matrix | 55.0% | 57.1% |
| Deflocculating agent | 3.0% | 0.0% |

TABLE 4A-continued

| | Formulations | |
|---|---|---|
| | MUP1 | CMT2 (Reference) |
| Activator composition | 42% | 42.9% |
| Compressive strength (MPa) | 45 | <10 |

This comparison shows that a formulation according to the invention can reach a mechanical strength of 45 MPa whereas the same formulation without a deflocculating agent (CMT2) has, according to patent application FR3016376, only a mechanical strength of 25 MPa. In addition, as above, a replication of these tests by the applicant did not allow to obtain a strength greater than or equal to 10 MPa for the CMT2 test. Thus, in the presence of a high concentration of a raw clay matrix, and in the absence of a deflocculating agent, a construction binder will not produce concrete with adequate mechanical properties. As described above, the presence of a deflocculating agent in combination with the raw clay matrix and the activator composition allows the mechanical strength of a construction binder to be improved.

Table 4B below shows the formulations according to the invention MUPS8-1 and MUPS12-1 in comparison with reference formulations in which the deflocculating agent has not been added.

TABLE 4B

| | Formulations | | | |
|---|---|---|---|---|
| | MUPS8-1 | MUPS8-2 (Reference) | MUPS12-1 | MUPS11-3 (Reference) |
| Raw Clay Matrix | 53.0% | 51% | 51% | 51% |
| Deflocculating agent | 1.5% | 0.0% | 1% | 0% |
| Activator composition | 20.5% | 24% | 24% | 24% |
| Metakaolin | 25% | 25% | 24% | 25% |
| CEM1 cement | 0% | 0% | 0% | 0% |
| Compressive strength (MPa) | 41 | 27 | 40 | 29 |

This comparison shows that a formulation according to the invention can reach a mechanical strength greater than or equal to 40 MPa whereas the same formulation without a deflocculating agent (MUPS8-2 or MUPS11-3) does not reach a mechanical strength of 30 MPa. As described in the previous paragraphs, the presence of a deflocculating agent in combination with the raw clay matrix, the activator composition and possibly metakaolin allows the mechanical strength of a construction binder here to be improved by more than about 30%.

Table 4C below details the formulation of several construction binders according to the invention in comparison with reference binders (MUPS2-1 and MUPS2-2). These construction binders differ in particular in that the construction binders according to the invention include a deflocculating agent.

TABLE 4C

| | Formulations | | | | |
|---|---|---|---|---|---|
| | MUPS2-1 (ref.) | MUPS2-2 (ref.) | MUPS3-1 | MUPS4-1 | MUPS5-1 |
| Raw Clay Matrix | 50.0% | 70.0% | 51.0% | 52.0% | 53.0% |
| Deflocculating agent | 0.0% | 0.0% | 2.0% | 1.5% | 3.0% |
| CEM1 cement | 50.0% | 30.0% | 47.0% | 46.5% | 44.0% |
| Compressive strength (MPa) | 8 | 3 | 25 | 30 | 33 |

Table 4C shows that formulations in which the cement has the role of the activator composition. Equivalent formulations in which the deflocculating agent has been removed have low and inadequate mechanical strengths.

On the contrary, a combination of a raw clay at a content greater than or equal to 50% in combination with cement and a deflocculating agent allows strengths of over 20 MPa to be achieved. The mechanical properties obtained are multiplied by a factor of more than three.

Use of a Combination of Metal Oxides and an Alkaline Activator Composition:

Table 5 below details the formulation of several construction binders according to the invention. In particular, these construction binders differ in that some include an alkaline activator composition (in this case a solution with NaTPP) and others Portland cement.

TABLE 5

| | Formulations | | | | |
|---|---|---|---|---|---|
| | MUP3 | MUP4 | MUP5 | MUPS2-3 | MUPS5-1 |
| Raw Clay Matrix | 54.6% | 54.0% | 51.3% | 55.0% | 60.0% |
| Deflocculating agent | 2.7% | 3.1% | 2.9% | 1.0% | 3.5% |
| BFS | 17.5% | 31.9% | 18.8% | 0.0% | 0.0% |
| Activator composition (NaTPP + NaOH + Na2SiO3) | 0.0% | 11.0% | 0.0% | 0.0% | 0.0% |
| CEM1 cement | 25.2% | 0.0% | 27.0% | 44.0% | 36.5% |
| Compressive strength (MPa) | 41 | 45 | 42 | 18 | 21 |

Table 5 shows that that the formulations including a mixture of:
 blast furnace slags (BFS) which include metal oxides and
  sodium tripolyphosphate
have mechanical strengths of 45 MPa.

Equivalent formulations in which the alkaline activator composition has been replaced by CEM1 cement have similar mechanical strengths.

In addition, the MUPSS-1 composition without BFS has acceptable but lower compressive strength values. This composition shows that, thanks to the present invention, it is possible to reach mechanical strength values higher than 20 MPa for these construction binders including more than 50% of a raw clay matrix.

Concrete Formulation from a Construction Binder According to the Invention:

Table 6 below details the formulation of several concretes including a reference concrete formed from Portland cement (B-Portland) and concretes formed from a construction binder according to the invention (MUP_BA1, MUP_BA2, MUP_BA3). These concretes differ in particular by the nature of the raw clay matrix, by the nature of the deflocculating agent and by the activation compositions used.

TABLE 6

|  |  | B-Portland | MUP_BA1 | MUP_BA2 | MUP_BA3 |
|---|---|---|---|---|---|
| Cement CEM I 52.5N | g (wt %/binder) | 240 (100%) | 84 (26%) | 0 | 0 |
| Clay | Nature | / | aquitaine | kaolinite | bentonite |
|  | g (wt %/binder) | 0 | 181 (55%) | 165 (50%) | 178 (54%) |
| Deflocculating agent | Nature | / | sodium humates | sodium lignosulfonate | sodium polyacrylate |
|  | g (wt %/binder) | 0 | 10 (3%) | 10 (3%) | 10 (3%) |
| Activator composition | Nature | / | BFS | BFS + NaOH + $Na_2SiO_3$ | BFS + NaTPP+ NaOH + Na2SiO3 |
|  | g (wt %/binder) | 0 | 54 (16%) | 101 (31%) | 141 (43%) |
| Metakaolin | g (wt %/binder) | 0 | 0 | 54 (16%) | 0 |
| Superplasticizer | Nature | Tempo12 | Tempo12 | Tempo12 | Tempo12 |
|  | g | 1.9 | 2.64 | 2.64 | 2.64 |
| Sand 0-4 | g | 900 | 900 | 900 | 900 |
| Aggregates 4-12 | g | 780 | 780 | 780 | 780 |
| Water | g | 205 | 185 | 175 | 175 |
| Compressive strength (MPa) | at day 28 | 40 | 38 | 39 | 41 |

As shown in Table 6, the concretes according to the invention have compressive strengths equivalent to the compressive strengths obtained with a concrete formed with Portland cement. Thus, the present invention allows a low-carbon construction binder to be formed, from a raw clay matrix, having sufficient mechanical properties to make it a construction material meeting the majority of the needs of the sector.

The invention claimed is:

1. A construction binder, including:
   at least 30 wt % of a raw clay matrix, the raw clay matrix comprising rock materials, the rock materials consisting of one or more uncalcined rock materials;
   a deflocculating agent;
   at least 10 wt % of an activator composition, wherein the activator composition is an alkaline activator composition comprising a compound having a pKa greater than or equal to 10; and
   at least 2 wt % of metal oxides.

2. The construction binder according to claim 1, further comprising at least 40 wt % of the raw clay matrix.

3. The construction binder according to claim 1, wherein the deflocculating agent is selected from the group consisting of:
   a non-ionic surfactant;
   an anionic agent;
   a polyacrylate;
   an amine; and
   mixtures thereof.

4. The construction binder according to claim 1, wherein the deflocculating agent accounts for at least 0.25 wt % of the construction binder.

5. The construction binder according to claim 1, wherein the raw clay matrix, the deflocculating agent, and the activator composition form a two-component or multi-component system.

6. The construction binder according to claim 1, comprising:
   30 wt % to 80 wt % of the raw clay matrix;
   0.25 wt % to 20 wt % of the deflocculating agent; and
   10 wt % to 50 wt % of the activator composition.

7. The construction binder according to claim 1, wherein the activator composition includes an organophosphorus compound.

8. The construction binder according to claim 1, comprising at least 5 wt % of the metal oxides.

9. The construction binder according to claim 8, wherein the metal oxides are selected from the group consisting of: iron oxides such as FeO, $Fe_3O_4$, $FezO_3$, alumina $Al_2O_3$, manganese (II) oxide MnO, titanium (IV) oxide $TiO_2$ and mixtures thereof.

10. The construction binder according to claim 1, further comprising:
    a blast furnace slag composition, wherein the blast furnace slag composition accounts for at least 5 wt % of the construction binder.

11. The construction binder according to claim 1, wherein the activator composition includes Portland cement.

12. The construction binder according to claim 1, comprising:
    40 wt % to 70 wt % of the raw clay matrix;
    0.5 wt % to 6 wt % of the deflocculating agent;
    10 wt % to 20 wt % of the activator composition; and
    20 wt % to 45 wt % of blast furnace slags.

13. The construction binder according to claim 1, comprising:
    35 wt % to 65 wt % of the raw clay matrix;
    0.5 wt % to 5 wt % of the deflocculating agent; and
    31 wt % to 49 wt % of Portland CEM1 cement.

14. The construction binder according to claim 1, comprising:
- 35 wt % to 65 wt % of the raw clay matrix;
- 0.5 wt % to 5 wt % of the deflocculating agent;
- 10 wt % to 30 wt % of blast furnace slags; and
- 15 wt % to 35 wt % of Portland CEM1 cement.

15. The construction binder according to claim 1, comprising:
- 45 wt % to 70 wt % of the raw clay matrix;
- 0.5 wt % to 6 wt % of the deflocculating agent;
- 10 wt % to 35 wt % of the activator composition; and
- 15 wt % to 30 wt % of metakaolin.

16. The construction binder according to claim 1, comprising:
- 45 wt % to 70 wt % of the raw clay matrix;
- 0.5 wt % to 5 wt % of the deflocculating agent;
- 10 wt % to 25 wt % of the activator composition;
- 5 wt % to 20 wt % of blast furnace slags; and
- 15 wt % to 30 wt % of metakaolin.

17. The construction binder according to claim 1, wherein the deflocculating agent is selected from the group consisting of:
- a polyoxyethylene ether;
- an anionic agent selected from: alkyl aryl sulphonates, amino alcohols, carbonates, silicates, fatty acids, humates, carboxylic acids, lignosulphonates, polyacrylates, phosphates or polyphosphates, sodium tripolyphosphate, sodium orthophosphate, carboxymethylcelluloses, and mixtures thereof;
- a polyacrylate selected from sodium polyacrylate or ammonium polyacrylate;
- an amine selected from: 2-amino-2-methyl-1-propanol; mono-, di- or triethanolamine; isopropanolamines; and N-alkylated ethanolamines; and
- mixtures thereof.

18. The construction binder according to claim 1, wherein the activator composition includes an organophosphorus compound including sodium tripolyphosphate, wherein the organophosphorus compound accounts for at least 2 wt % of the construction binder.

19. A method of preparing the construction binder according to claim 1, comprising:
- preparing a clay suspension including said raw clay matrix, said deflocculating agent, and water;
- adding said activator composition to the clay suspension; and
- mixing so as to obtain the construction binder.

20. The method according to claim 19, further comprising:
- adding aggregates, recycled or not, selected from fillers, powders, sand, grit, gravel, and/or fibers, and optionally pigments.

21. The method according to claim 19, further comprising:
- adding sand and water to form mortars, coatings or plasters.

22. A method of production, comprising:
- admixing the construction binder according to claim 1 to produce one or more of: floor coverings, wall coverings, cladding panels, boarding elements, roof coverings of a tile type, extruded or molded construction modules, or various extruded shapes.

23. A method of production, comprising:
- admixing the construction binder according to claim 1 to produce one or more of: composite materials, prefabricated blocks, prefabricated wall elements, or any other prefabricated construction element.

24. A method of producing concrete, comprising:
- admixing the construction binder according to claim 1 to produce concrete having a minimum compressive strength on cylinders at day 28 as measured by the NF EN 206-1 standard greater than or equal to 20 MPa.

* * * * *